Figure 1:
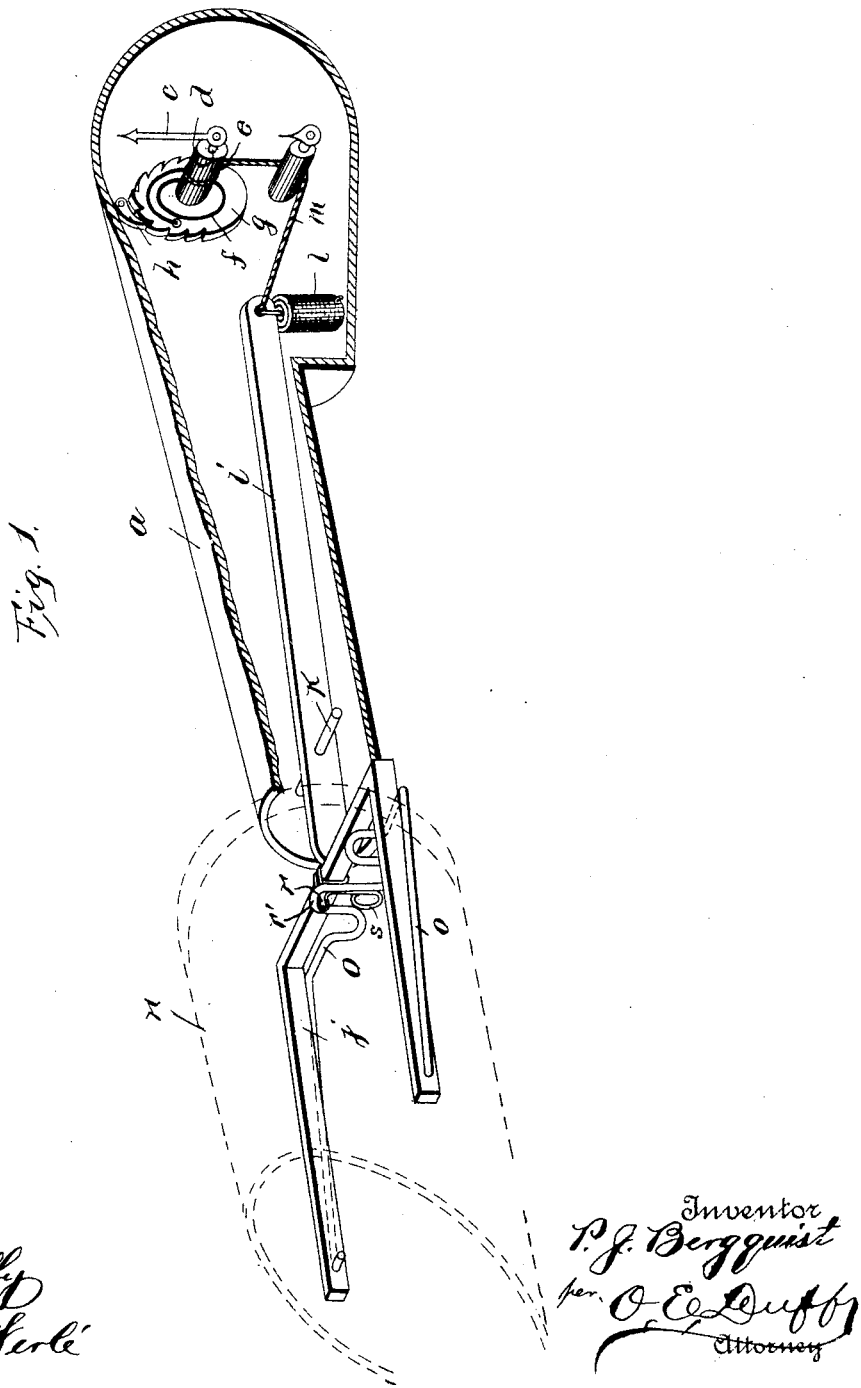

(No Model.) 2 Sheets—Sheet 1.

P. J. BERGQUIST.
WEIGHING SCOOP.

No. 537,743. Patented Apr. 16, 1895.

Witnesses
E. C. Duffy
Chas. M. Werle

Inventor
P. J. Bergquist
per O. E. Duffy
Attorney (No Model.) 2 Sheets—Sheet 2.
P. J. BERGQUIST.
WEIGHING SCOOP.
No. 537,743. Patented Apr. 16, 1895.
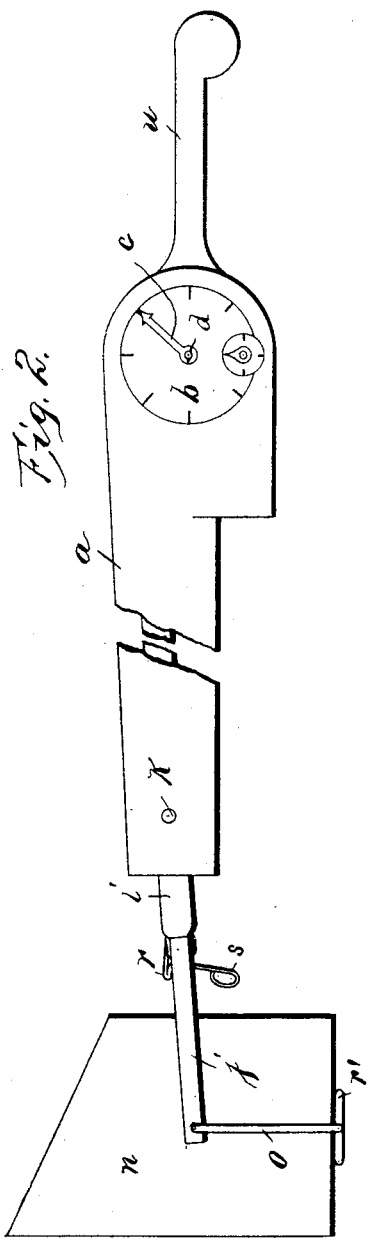
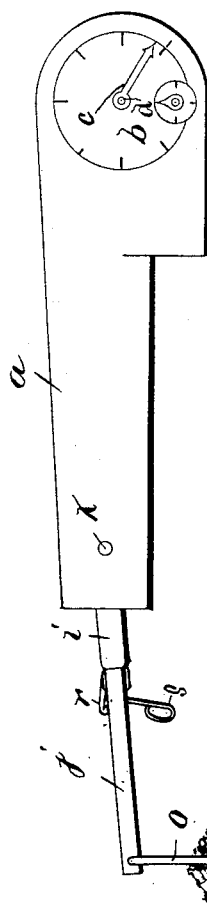
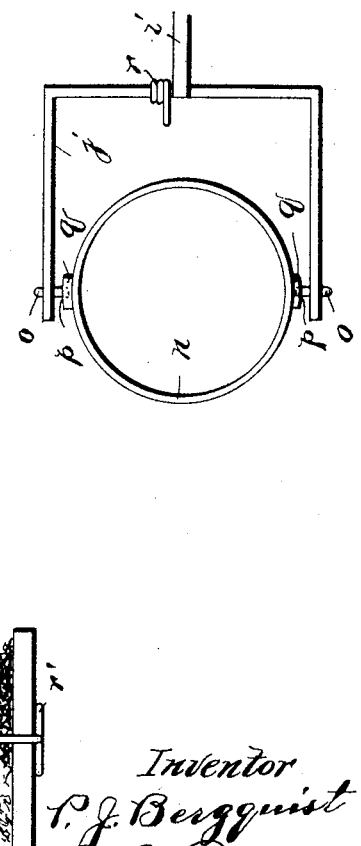
Witnesses
E. E. Duff
Chas. M. Merle
Inventor
P. J. Bergquist
per O. E. Duff
Attorney
THE NORRIS PETERS CO., PHOTO-LITHO., WASHINGTON, D. C.

UNITED STATES PATENT OFFICE.

PETER J. BERGQUIST, OF MOORHEAD, MINNESOTA.

WEIGHING-SCOOP.

SPECIFICATION forming part of Letters Patent No. 537,743, dated April 16, 1895.

Application filed May 14, 1894. Serial No. 511,191. (No model.)

*To all whom it may concern:*

Be it known that I, PETER J. BERGQUIST, of Moorhead, in the county of Clay and State of Minnesota, have invented certain new and useful Improvements in Weighing-Scoops; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in weighing scoops or shovels.

The object of the invention is to provide an improved automatic weighing scoop, exceedingly strong, simple and durable in construction and composed of a minimum number of parts whereby material can be scooped and shoveled up and weighed.

The invention consists in certain novel features of construction and in combination of parts more fully and particularly described hereinafter and pointed out in the claims.

Referring to the accompanying drawings:—Figure 1, is a perspective view showing the scoop proper in dotted lines in its normal operative position, the handle of the scoop being broken away and showing the interior construction thereof. Fig. 2, is a side elevation of the scoop showing the scoop released and swinging in an upright position, a different form of scoop being shown, also a somewhat different form of handle being shown. Fig. 3, is a detail side elevation showing the scoop handle, a balanced fork or beam to receive the scoop, the scoop not being shown. Fig. 4, is a detail plan view of the fork of the beam, and the scoop in its weighing position.

In the drawings the reference letter $a$, indicates the handle of the scoop. This handle is made hollow and of a suitable length for the purpose intended. At its outer end the hollow handle is provided with an enlargement, the exterior of which is provided with a graduated face or dial $b$, over which the indicating finger or hand $c$, is arranged to travel.

$d$, is a transverse shaft on which this finger $c$, is mounted. This shaft extends transversely through the enlarged portion of the handle and is suitably journaled therein.

$e$, is a drum rigid on the shaft $d$, within the handle.

$f$, is a coiled spring having one end attached to the shaft $d$, and the other end to the freely rotatable disk $g$, having the ratchet teeth on its exterior.

$h$, is a pawl secured to the interior of the handle and engaging the ratchet teeth. This spring is arranged to return the shaft $d$, and indicating finger to zero and yieldingly hold the same in this position and the spring can be varied in tension by turning the disk so as to properly balance and hold the parts. In this connection it should be observed that the ratchet wheel is rotatable independently of the shaft and its drum $e$, and that the pawl $h$, normally holds the wheel against rotation so that the tension of the spring on the shaft can be easily controlled by rotating the ratchet wheel in one direction or the other.

$i$, is a scale beam longitudinally arranged within the handle and extending downwardly through the open end of the handle and provided with a forked outer end $j$. The scale beam between its ends is fulcrumed or pivoted at $k$, on suitable journals in the handle, so that its outer and inner ends rock vertically. The inner end of this beam is suitably attached to the spring $l$, secured within the hollow handle. This spring is preferably in the form of a retractive coiled spring secured usually at its lower end in the enlarged portion of the handle and having the inner end of the beam pivotally attached to its upper end. A suitable flexible connection $m$, is secured to the inner end of the beam and also to the drum on the shaft $d$, and is wound on said drum so that when the inner end of the beam moves up the shaft $d$, and finger $c$, will be revolved.

$n$, is a scoop of any suitable shape in cross section and having the open end with the usual cutting edge. This scoop is usually in the form of a closed box having one open end. This scoop is suitably pivoted and balanced in the forked end of the beams. This scoop can be suitably pivoted between its ends in the ends of said fork. If desired the scoop can be removably pivoted in the fork by means of the U-shaped spring wire $o$, having its outer ends passing inwardly through apertures in the beam fork ends so as to turn therein and so that the projecting points thus formed can be sprung into and out of the depressions p, in opposite sides of the scoop. The U-shaped wire extends along the outer sides of the arms of the beam fork and from thence across the end of the scoop. This transverse portion of the U-shaped wire o, can have a plate q, suitably secured thereto to fit the inner end of the scoop. By this means the scoop can be removed and the device employed to weigh any article by permitting the U-shaped frame to hang in the vertical position and placing material or article to be weighed in the pan or plate q.

r, is a suitable spring catch mounted at the open end of the scoop handle on the fork of the scale beam and arranged to engage a stop or shoulder r' on the outer end of the plate q, and thereby hold the scoop in its normal operative position in continuation of the scoop handle so that the article can be employed for scooping up material to fill the scoop proper with the desired quantity. This catch can be provided with the downwardly extending handle end s, so that the catch can be released by means of the finger and the scoop allowed to drop to the vertical position so that the material therein can be weighed. The scale beam is free to move and consequently the weight of the material in the scoop draws down the outer end of the beam against the tension of the spring and consequently the indicating finger is moved around on the dial and indicates the weight of the material in the scoop. This scoop can have a closed or sieved bottom as desired.

If desired a small indicating finger and scale can be provided suitably connected with the moving parts of the shaft d, or the scale beam so as to indicate every complete revolution of the shaft d. This auxiliary indicating device is only intended for use where my invention is applied to shovels or where heavy loads are to be weighed and the main indicator is liable to make more than one revolution. Fig. 1 shows this auxiliary indicating device operated by the guiding drum which directs the connection m up to drum d. This guiding drum carries an indicating finger over a scale at the exterior of the handle, the guiding drum and drum d having different diameters so as to rotate at different speeds.

Where this present invention is to be employed for shovels or other large implements a rearwardly extending handle u, from the enlargement in the scale beam handle can be employed and several springs can be connected to act on the scale beam.

The utility, simplicity and durability of this invention are obvious.

It is evident that various changes might be made in the forms, arrangements and constructions of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. A scoop comprising the hollow handle, a scale beam fulcrumed therein between its ends and extending longitudinally thereof, a coiled spring secured to the inner end of the beam, and a scoop pivotally connected to the outer end of the beam, and carried entirely by the beam.

2. The scoop comprising the hollow handle, a yieldingly held scale beam arranged longitudinally and fulcrumed within the handle having a forked outer end, and a scoop pivoted in the fork, and entirely sustained by the scale beam.

3. A weighing scoop having the hollow handle, a scale beam fulcrumed therein between its ends and at its outer portion carrying the scoop, and the indicating device comprising a shaft journaled in the handle and having a connection wound thereon and secured to the inner end of the scale beam.

4. A weighing scoop having a handle, a scale beam fulcrumed in the handle, the scoop pivoted in the outer portion of the scale beam so as to drop to a vertical position when being weighed, and means substantially as described to hold the scoop in filling position.

5. A weighing scoop having a handle, a scale beam therein, a scoop pivotally mounted in the outer end of the scale beam, and a catch to detachably hold the scoop in its normal operative position.

6. A weighing scoop having the removable weighing scoop proper, a forked scale beam, the U-shaped piece journaled therein and carrying a plate, and having the ends turned in to engage and form the pivots and supports of the scoop proper.

7. In a weighing scoop, the handle having the forked scale beam, the scoop proper, the U-shaped piece having the inturned ends passing loosely through the ends of said fork, and adapted to removably enter depressions in the sides of the scoop proper.

8. A scoop comprising the hollow handle, the spring controlled scale beam fulcrumed therein and having an indicating device, and having the forked outer end in continuation of the handle, the scoop pivoted in the outer end of the fork so that its bottom can drop therefrom when weighing, and a catch at the closed end of the fork to hold the closed end of the scoop in the fork for scooping purposes.

In testimony that I claim the foregoing as my own I affix my signature in presence of two witnesses.

PETER J. BERGQUIST.

Witnesses:
GEORGE N. LAMPHERE,
F. L. TEOTSON.